United States Patent
Jules-Perez et al.

(10) Patent No.: US 12,511,132 B2
(45) Date of Patent: Dec. 30, 2025

(54) DYNAMIC PROVISIONING OF A COMPUTING ENVIRONMENT

(71) Applicant: Capital One Services, LLC, McLean, VA (US)

(72) Inventors: Maureen Jules-Perez, Leesburg, VA (US); Louis Buell, Chevy Chase, MD (US); Michael Kirby, Bristow, VA (US); Kadhiresan Kanniyappan, Ashburn, VA (US); Ebrima N. Ceesay, Vienna, VA (US); Steven Coulbourne, Haymarket, VA (US)

(73) Assignee: Capital One Services, LLP, McLean, VA (US)

( * ) Notice: Subject to any disclaimer, the term of this patent is extended or adjusted under 35 U.S.C. 154(b) by 147 days.

(21) Appl. No.: 18/493,104

(22) Filed: Oct. 24, 2023

(65) Prior Publication Data

US 2025/0130816 A1 Apr. 24, 2025

(51) Int. Cl.
*G06F 9/445* (2018.01)
*G06F 11/34* (2006.01)
*H04L 67/306* (2022.01)

(52) U.S. Cl.
CPC ...... *G06F 9/44505* (2013.01); *G06F 11/3438* (2013.01); *H04L 67/306* (2013.01)

(58) Field of Classification Search
CPC . G06F 9/44505; G06F 11/3438; H04L 67/306
USPC .......................................................... 713/1
See application file for complete search history.

(56) References Cited

U.S. PATENT DOCUMENTS

| | | | | |
|---|---|---|---|---|
| 5,261,077 A | * | 11/1993 | Duval | G06F 7/768 710/306 |
| 6,360,334 B1 | * | 3/2002 | Kavanagh | G06F 8/64 726/30 |
| 7,523,186 B1 | * | 4/2009 | Waters | G06F 15/173 709/217 |
| 9,229,905 B1 | * | 1/2016 | Penilla | G06Q 20/18 |
| 9,917,737 B2 | * | 3/2018 | Neilson | G06F 8/00 |
| 2006/0006904 A1 | * | 1/2006 | Marui | G06F 30/34 326/38 |
| 2006/0036715 A1 | * | 2/2006 | Ghattu | H04L 67/125 709/220 |
| 2006/0189440 A1 | * | 8/2006 | Gravagne | A63B 24/00 482/8 |
| 2009/0079555 A1 | * | 3/2009 | Aguirre De Carcer | G07C 5/008 701/2 |
| 2009/0150523 A1 | * | 6/2009 | Gray | H04L 67/04 709/220 |
| 2009/0271609 A1 | | 10/2009 | Baskey et al. | |
| 2009/0293072 A1 | * | 11/2009 | Elshocht | G06F 1/3287 719/327 |

(Continued)

*Primary Examiner* — Paul R. Myers
(74) *Attorney, Agent, or Firm* — Harrity and Harrity, LLP

(57) ABSTRACT

In some implementations, a device may determine a session-specific profile for a user that is to begin a session for a computing environment. The device may determine a computing configuration, for the computing environment, that is personalized for the user based on the session-specific profile for the user and based on historical behavior of the user. The computing configuration may include at least one of a hardware configuration or a software configuration for the computing environment. The device may cause configuration of the computing environment according to the computing configuration.

20 Claims, 9 Drawing Sheets

(56) References Cited

U.S. PATENT DOCUMENTS

| | | | |
|---|---|---|---|
| 2011/0138385 A1* | 6/2011 | Schmelter | G06F 11/3466 718/1 |
| 2011/0225642 A1* | 9/2011 | Gopalakrishna | H04L 67/54 709/221 |
| 2011/0314389 A1* | 12/2011 | Meredith | G06F 3/048 709/201 |
| 2012/0158203 A1* | 6/2012 | Feldstein | H04L 12/2829 713/320 |
| 2013/0124529 A1* | 5/2013 | Jacob | G06F 9/44505 707/E17.089 |
| 2013/0209108 A1 | 8/2013 | Krishnakumar et al. | |
| 2013/0262912 A1* | 10/2013 | Dasari | G06F 9/4411 713/1 |
| 2014/0149328 A1* | 5/2014 | Posse | G06F 40/30 706/46 |
| 2014/0309868 A1* | 10/2014 | Ricci | G06Q 10/00 701/36 |
| 2015/0293765 A1* | 10/2015 | Angus | G06F 11/1433 717/121 |
| 2016/0125085 A1* | 5/2016 | Vasudevan | G06F 16/9535 707/734 |
| 2016/0239893 A1* | 8/2016 | Kosseifi | G06F 16/335 |
| 2016/0359864 A1* | 12/2016 | Dhaliwal | H04L 63/0861 |
| 2017/0017610 A1* | 1/2017 | Suh | G06F 1/3225 |
| 2017/0123634 A1* | 5/2017 | Pai | G06Q 10/10 |
| 2017/0124271 A1* | 5/2017 | Aase | G16Z 99/00 |
| 2017/0366254 A1* | 12/2017 | Gao | H04B 10/27 |
| 2018/0131574 A1* | 5/2018 | Jacobs | H04L 43/0817 |
| 2018/0330818 A1* | 11/2018 | Hsieh | G16H 30/40 |
| 2019/0035244 A1* | 1/2019 | Garg | H04B 17/318 |
| 2019/0057166 A1* | 2/2019 | Liongosari | B60N 2/0278 |
| 2021/0051132 A1* | 2/2021 | Huston, III | H04L 67/1031 |
| 2021/0132926 A1* | 5/2021 | Wangikar | H04L 67/34 |
| 2022/0114136 A1* | 4/2022 | Zhu | G06F 9/4451 |
| 2022/0172594 A1* | 6/2022 | Cho | B60Q 1/525 |
| 2024/0036999 A1* | 2/2024 | Aurongzeb | G06F 9/5055 |
| 2024/0248735 A1* | 7/2024 | Ge | G06F 9/452 |
| 2025/0094786 A1* | 3/2025 | Williams | G06F 16/90335 |

\* cited by examiner

DYNAMIC PROVISIONING OF A COMPUTING ENVIRONMENT

BACKGROUND

A computing environment encompasses an ecosystem in which computing tasks are performed. For example, a computing environment may include a combination of hardware, software, and network infrastructure that enables the execution of computing programs, as well as the storage, processing, and retrieval of data.

SUMMARY

Some implementations described herein relate to a system for dynamic provisioning of a computing environment. The system may include one or more memories and one or more processors communicatively coupled to the one or more memories. The one or more processors may be configured to identify that a user is entering an access-controlled area to begin a session for the computing environment. The one or more processors may be configured to determine, based on detection that the user is entering the access-controlled area, a session-specific profile for the user. The one or more processors may be configured to determine, based on the session-specific profile of the user and using one or more machine learning models, a computing configuration, for the computing environment, that is personalized for the user, where the computing configuration includes a hardware configuration and a software configuration for the computing environment. The one or more processors may be configured to cause, responsive to the user entering the access-controlled area, configuration of the computing environment according to the computing configuration. The one or more processors may be configured to monitor activities of the user with respect to the computing environment. The one or more processors may be configured to determine, based on the activities of the user and using the one or more machine learning models, a productivity customization for the computing environment. The one or more processors may be configured to cause the productivity customization to be applied to the computing environment.

Some implementations described herein relate to a method for dynamic provisioning of a computing environment. The method may include determining, by a device, a session-specific profile for a user that is to begin a session for the computing environment. The method may include determining, by the device, a computing configuration, for the computing environment, that is personalized for the user based on the session-specific profile for the user and based on historical behavior of the user, where the computing configuration includes at least one of a hardware configuration or a software configuration for the computing environment. The method may include causing, by the device, configuration of the computing environment according to the computing configuration.

Some implementations described herein relate to a non-transitory computer-readable medium that stores a set of instructions for dynamic provisioning of a computing environment. The set of instructions, when executed by one or more processors of a device, may cause the device to monitor activities of a user with respect to the computing environment. The set of instructions, when executed by one or more processors of the device, may cause the device to determine, based on the activities of the user and using one or more machine learning models, a productivity customization for the computing environment. The set of instructions, when executed by one or more processors of the device, may cause the device to cause the productivity customization to be applied to the computing environment.

DETAILED DESCRIPTION

Figure 1A:
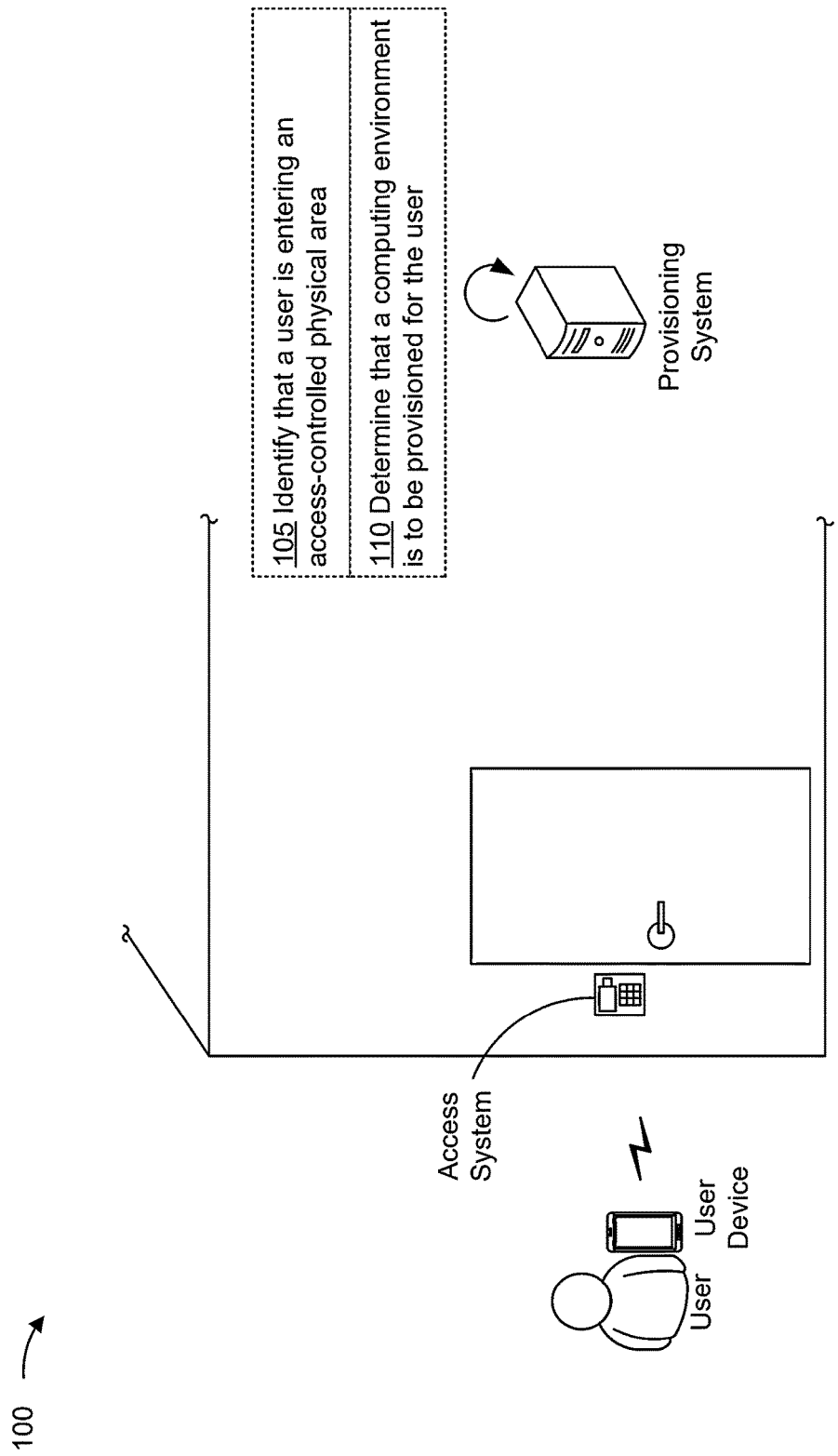
FIGS. 1A-1E are diagrams of an example associated with dynamic provisioning of a computing environment, in accordance with some embodiments of the present disclosure.

The following detailed description of example implementations refers to the accompanying drawings. The same reference numbers in different drawings may identify the same or similar elements.

A user's work area may include one or several hardware devices, such as a desktop computer, a tablet computer, a smartphone, a printer, a teleconferencing system, or the like. These hardware devices, along with software provisioned on the hardware devices, may form a computing environment that is used by the user. In some cases, to assist the user, powering on of the hardware devices may be automated according to a schedule and/or as a group. However, the user may use different hardware devices to varying degrees over the course of a day, and how and when different hardware devices are used by the user may change from day to day. Accordingly, automated or scheduled powering on of the hardware devices may consume excessive power resources and/or network resources by powering on hardware devices that are not needed by the user or before they will be needed by the user.

Similarly, different software applications of the computing environment may be used by the user to varying degrees over the course of a day. For example, some software applications may be used extensively by the user, while others may be used minimally or not at all by the user. In general, at a startup of a session for the user, a set of software applications are launched according to a startup configuration, and launching each of these software applications consumes computing resources (e.g., memory resources and/or processor resources of the computing environment). The startup configuration is generally static, but may be manually adjusted from time to time by the user or an administrator of the computing environment. Accordingly, software applications that are minimally, or not at all, used by the user may be launched at startup, thereby consuming excessing computing resources. Moreover, the user's usage of software applications may change from day to day. For example, a software application used extensively by the user one day may be unused by the user another day. Accordingly, optimization of the startup through adjustment of the startup configuration may be impractical.

Some implementations described herein enable dynamic provisioning of a computing environment. For example, a hardware configuration and/or a software configuration of the computing environment may be personalized for a user with respect to the user's session for the computing environment. In some implementations, a session-specific profile may be determined for a user based on user-generated data (e.g., calendar appointments, email messages, or the like), user metadata (e.g., an organizational role of the user, a team on which the user works, or the like), and/or user time and location data (e.g., a time that the user begins the session, an office location where the user is working, or the like). Based on the session-specific profile, one or more machine learning models (e.g., trained based on historical behavioral data) may determine a computing configuration for the computing environment that is personalized for the user, and the computing environment may be configured according to the computing configuration. In this way, the computing environment is tailored to the particular needs of the user, thereby conserving power resources and/or network resources that otherwise would be consumed by powering on hardware devices that are not needed by the user, as well as conserving computing resources that otherwise would be consumed by launching software applications that are not needed by the user.

Furthermore, the user's activities with respect to the computing environment may be monitored. Based on the user's activities, the one or more machine learning models may determine a productivity customization for the computing environment, and the productivity customization may be applied to the computing environment. The productivity customization may include terminating a software application, adjusting a state of a software application, automating a repetitive task, or the like. In this way, with the productivity customization applied, an efficiency of the computing environment is further improved, thereby conserving additional computing resources.

FIGS. 1A-1E are diagrams of an example 100 associated with dynamic provisioning of a computing environment. As shown in FIGS. 1A-1E, example 100 includes a provisioning system, one or more computing devices associated with a computing environment, a user device, an access system, a cloud computing system, a data system, and a physical control system. These devices are described in more detail in connection with FIGS. 3 and 4.

The provisioning system may be associated with an entity, such as a business. The user may be a worker, such as an employee, for the entity. In some examples, the entity may have a physical presence (e.g., an office) at multiple locations (e.g., offices in multiple different cities or multiple offices at different locations in a city). For example, the user may be permitted, or required, to work from the multiple locations. In some examples, the user may have a hybrid working arrangement with the entity, whereby the user is permitted to work from the user's home.

The provisioning system may be communicatively connected to one or more other systems of the entity or of a building (e.g., an office building) associated with the entity. For example, the provisioning system may communicate with the access system (e.g., associated with a turnstile, a gate, an entrance, an elevator, or the like) to identify whether the user has entered a building. The provisioning system may communicate with the cloud computing system to configure or control a virtual machine for the user. The provisioning system may communicate with the physical control system to configure or control a physical device used by the user. The provisioning system may communicate with the data system to obtain information associated with the user. In some implementations, the provisioning system may include, or may be included in, the access system, the cloud computing system, the physical control system, and/or the data system.

The computing environment may include the one or more computing devices, which may be connected to each other via a network (e.g., a local area network (LAN) associated with an office of the entity, the Internet, or the like). The computing devices may include a desktop computer, a laptop computer, a tablet computer, a smartphone, a server, a printer, a teleconferencing device, a telephony device, a projector device, an augmented reality (AR) device, and/or another type of computing device. The computing devices may be located in one or more workspaces used by the user (e.g., an office, a cubicle, a desk area, a conference room, a home office, or the like). The computing environment may also include software applications that are run on, or are accessible from, the computing devices. For example, the software applications may include a word processing application, a spreadsheet application, a video conferencing application, an instant messaging application, an email application, a specialty application developed for the entity, and/or another type of software application.

As shown in FIG. 1A, and by reference number 105, the provisioning system may identify that the user is entering an access-controlled area. The access-controlled area may be a physical area, such as an office building associated with the entity, an elevator of the office building, a suite of the office building, or the like. Additionally, or alternatively, the access-controlled area may be a virtual area, such as in a virtual reality environment. When the user is entering the access-controlled area, a device associated with the user (e.g., a key card, a key fob, a smartphone, or the like) may transmit a signal to the access system that controls access to the area. The access system may receive the signal, authenticate the user based on information indicated by the signal, and provide access to the area if the user is authenticated. In some implementations, the provisioning system may receive an indication from the access system that the user is entering the access-controlled area, and the provisioning system may identify that the user is entering the access-controlled area based on the indication. In some implementations, the provisioning system may include, or may be included in, the access system, and the provisioning system may identify that the user is entering the access-controlled area based on authenticating the user. The provisioning system may collect, or otherwise obtain, information relating to the user entering the access-controlled area. For example, the information may indicate a time of entry, a date of entry, an entrance that was used, or the like.

The user may be entering the access-controlled area to begin a session for the computing environment. A session may be a time period of interaction between the user and the computing environment. The time period may be a day, a time period between consecutive log-ins of the user in connection with the computing environment, a time period between consecutive entrances of the user into the access-controlled area, or the like.

As shown by reference number 110, the provisioning system may determine that the computing environment is to be provisioned for the user. For example, the provisioning system may determine that the computing environment is to be provisioned for the user based on identifying that the user is entering the access-controlled area (e.g., the user entering the area is a trigger for provisioning the computing environment). Additionally, or alternatively, the provisioning system may determine that the computing environment is to be provisioned for the user based on a current time and/or a current day of the week, as well as a historical behavior of the user. For example, historically on Wednesdays, the user may begin using the computing environment at 9:00 am. Additionally, or alternatively, the provisioning system may determine that the computing environment is to be provisioned for the user based on a content of a message (e.g., an instant message, an email message, or the like) sent to the user. For example, the message may indicate a deadline for the user, a proposed time for a call with the user, or the like. Additionally, or alternatively, the provisioning system may determine that the computing environment is to be provisioned for the user based on one or more appointments on the user's calendar. The aforementioned triggers for provisioning the computing environment for the user are provided as examples, and the provisioning system may determine that the computing environment is to be provisioned for the user, additionally or alternatively, based on one or more other triggers.

Figure 1B:
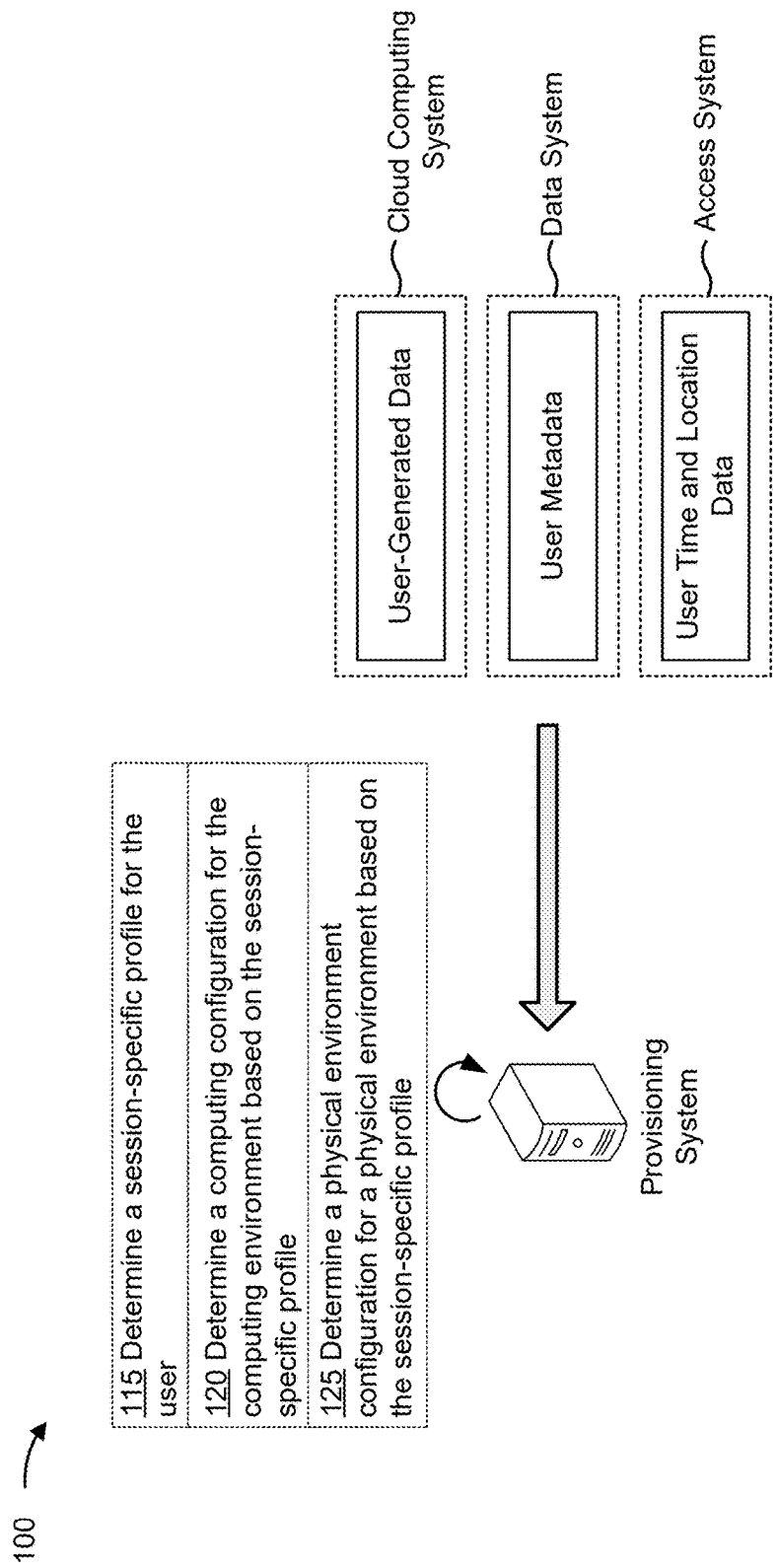

As shown in FIG. 1B, and by reference number 115, the provisioning system may determine a session-specific profile for the user (e.g., which is to be used for provisioning the computing environment for the user). The session-specific profile is a profile of the user that is specific to a particular session in which the user is using the computing environment. Thus, the session-specific profile for the user may change from session-to-session (e.g., from day-to-day), although some elements of the session-specific profile may remain constant across multiple sessions. In some implementations, the provisioning system may determine the session-specific profile for the user based on detecting that the user is entering the access-controlled area, determining that the computing environment is to be provisioned for the user, or otherwise because the user is to begin a session for the computing environment.

The session-specific profile may indicate characteristics associated with the user in connection with the session. The characteristics may be indicative of the probable (e.g., anticipated) needs of the user for the session (e.g., throughout the session or when the session first begins). The provisioning system may determine the session-specific profile for the user based on user-generated data, user metadata, and/or user time and location data.

The provisioning system may obtain the user-generated data from the cloud computing system and/or the data system. The provisioning system may obtain the user metadata from the data system. The provisioning system may obtain the user time and location data from the access system and/or from a user device associated with the user. The user-generated data may include calendar appointment data, messaging data (e.g., a content of instant messages, email messages, text messages, or the like, associated with the user), and/or planning data (e.g., checklist data, task assignment data, workflow management data, or the like), among other examples. The user metadata may indicate demographic data associated with the user, work efficiency data associated with the user, organizational data associated with the user (e.g., a role of the user in an organizational structure, one or more teams with which the user is associated, one or more projects with which the user is associated, or the like). The user time and location data may indicate a time at which the user has entered the access-controlled area, a time at which the user has begun the session, a location (e.g., an office location) from which the user is working, location data (e.g., geographic coordinate data) associated with timestamps, or the like.

In one example, the session-specific profile may indicate a role of the user in an organizational structure of the entity (e.g., administrative assistant, engineer, executive, or the like), a work location of the user (e.g., an office location associated with the access-controlled area, a location of the user's home if the user is working remotely from home, a location of a hotel to which the user has traveled for a business trip, or the like), a time at which the user entered the access-controlled area, one or more appointments for the user, one or more deadlines for the user, and/or one or more tasks to be completed by the user, among other examples. In some implementations, the provisioning system may determine appointments, deadlines, and/or tasks for the user by performing natural language processing (NLP) of contents of messages associated with the user (e.g., messages sent or received by the user), such as instant messages, email messages, or the like. Additionally, or alternatively, the provisioning system may determine appointments, deadlines, and/or tasks for the user by performing NLP of contents of calendar appointments associated with the user and/or extracting data from calendar appointments associated with the user. For example, the provisioning system may periodically retrieve messages and/or appointment data (or retrieve a message and/or appointment data based on detecting a new message and/or a new appointment associated with the user), process the messages and/or the appointment data using NLP, and determine one or more appointments, deadlines, and/or tasks for the user based on processing the messages and/or the appointment data.

As shown by reference number 120, the provisioning system may determine a computing configuration for the computing environment based on the session-specific profile. The computing configuration may be personalized for the user. The personalization may be in anticipation of the needs of the user for the session. For example, the personalization may be based on historical behavior of the user, historical behavior of other users (e.g., that are similar to the user based on demographics, a role in an organization structure, or the like), or the like. Historical behavioral data may indicate, in connection with a session-specific profile associated with a user, computing devices that were powered on or powered off by a user, software applications that were opened or closed by a user, a state of use of a software application by a user (e.g., indicating settings that were used, user interfaces that were used, or the like), software applications that were muted by a user, software applications that were sent to a background, tasks that were performed by a user, or the like.

Figure 2:
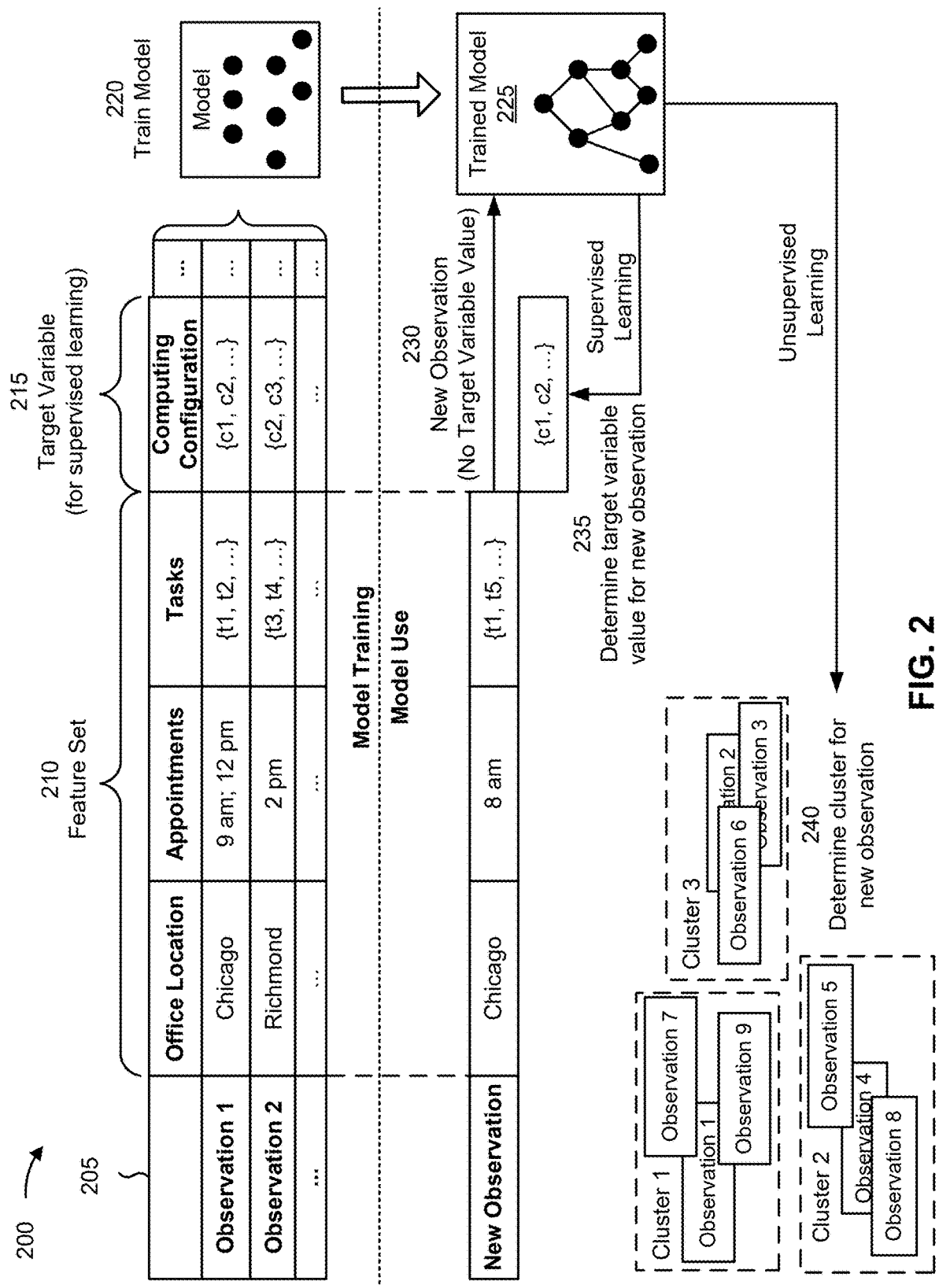
FIG. 2 is a diagram illustrating an example of training and using a machine learning model in connection with dynamic provisioning of a computing environment, in accordance with some embodiments of the present disclosure.

In some implementations, the provisioning system may determine the computing configuration using one or more machine learning models, as described further in connection with FIG. 2. For example, the one or more machine learning models may be trained to output a computing configuration based on an input of a session-specific profile. Training data for the one or more machine learning models may be based on historical behavioral data, as described above.

The computing configuration may include a hardware configuration and/or a software configuration for the computing environment. The hardware configuration may indicate whether particular computing devices of the computing environment are to be powered on or powered off, when the particular computing devices of the computing environment are to be powered on or powered off, and/or whether particular computing devices of the computing environment are to be in a standby mode or a sleep mode, among other examples. The software configuration may indicate one or more software applications that are to be launched at a startup of a computing device, a state in which a software application is to be launched, and/or whether a software application is to be launched in a background or in a foreground, among other examples. A state of a software application may include one or more preference settings that are to be used for the software application, one or more files that are to be opened in the software application, and/or one or more user interfaces (e.g., web browser tabs) that are to be opened or closed in the software application, among other examples.

As an example, if the session-specific profile indicates that the user has a morning video call, and if the behavioral history indicates that the user conducts video calls in conference room A, then the computing configuration may indicate that a video conferencing system in conference room A is to be powered on in the morning and that a video calling software application is to be launched. As another example, if the session-specific profile indicates that the user has a deadline to submit a market research report, and if the behavioral history indicates that the user uses a particular set of websites to conduct market research, then the computing configuration may indicate that a desktop computer in the user's office is to be powered on and that a web browser is to be launched with separate tabs for each of the websites.

As shown by reference number 125, the provisioning system may determine a physical environment configuration for a physical environment based on the session-specific profile. The physical environment configuration may be personalized for the user. The personalization may be in anticipation of the needs of the user for the session. For example, the personalization may be based on historical behavior of the user, historical behavior of other users (e.g., that are similar to the user based on demographics, a role in an organization structure, or the like), or the like. Historical behavioral data may indicate, in connection with a session-specific profile associated with a user, workspaces (e.g., offices, desks, cubicles, conference rooms, or the like) that were used by a user, a lighting setting used by a user, a temperature setting used by a user, a desk configuration (e.g., a desk height) used by a user, or the like. The physical environment may be associated with the access-controlled area.

In some implementations, the provisioning system may determine the physical environment configuration using the one or more machine learning models, as described further in connection with FIG. 2. For example, the one or more machine learning models may be trained to output a physical environment configuration based on an input of a session-specific profile. Training data for the one or more machine learning models may be based on historical behavioral data, as described above.

The physical environment configuration may indicate one or more workspaces to be used by the user, a time at which the user is to use each workspace, a lighting setting for each workspace, a temperature setting for each workspace, and/or a desk configuration for each workspace. As an example, if the session-specific profile indicates that the user has a morning video call, and if the behavioral history indicates that the user conducts video calls using a bright lighting setting in conference room A, then the physical environment configuration may indicate that a bright lighting setting is to be used in the morning for conference room A.

Figure 1C:
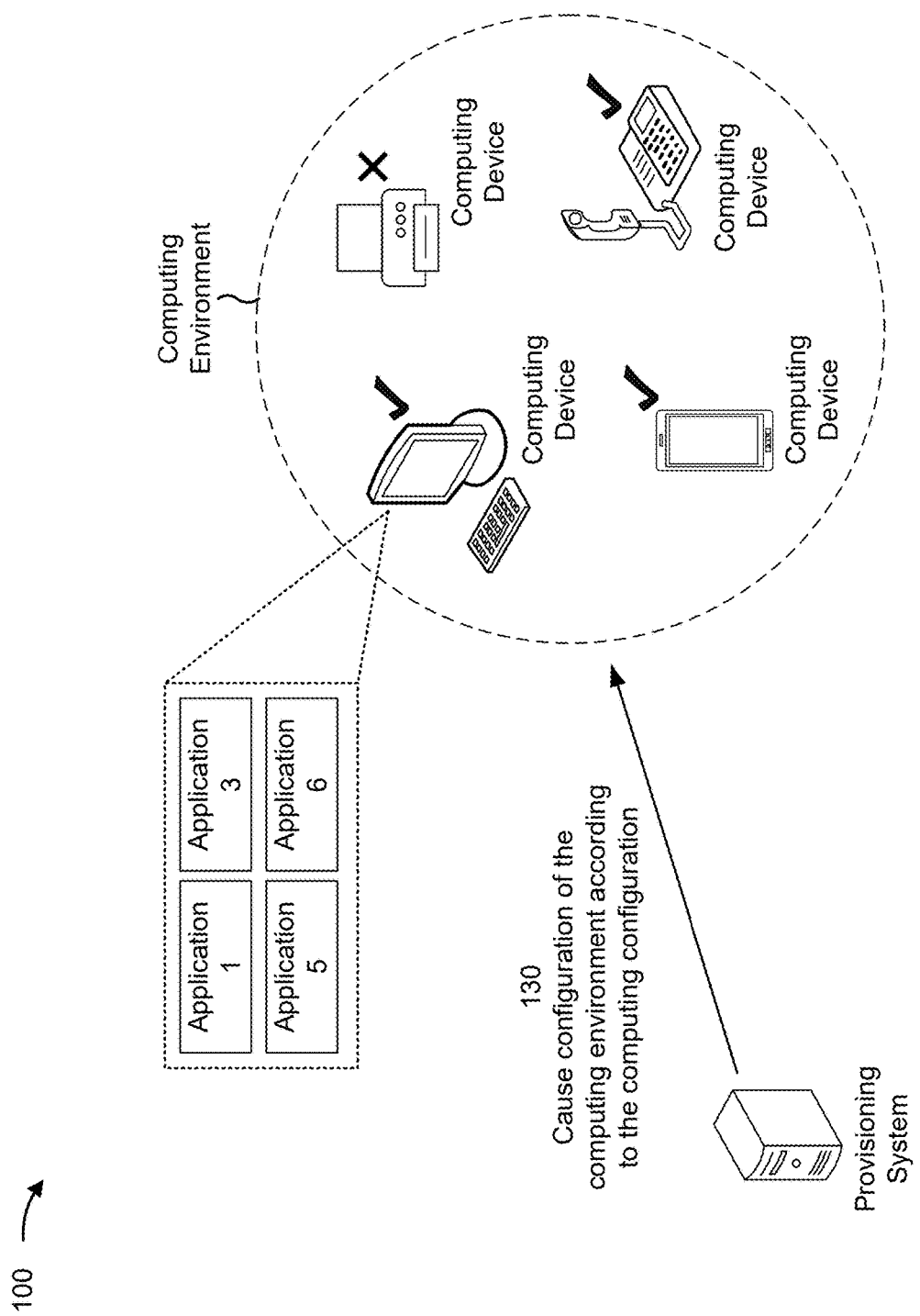

As shown in FIG. 1C, and by reference number 130, the provisioning system may cause configuration of the computing environment according to the computing configuration (e.g., responsive to the user entering the access-controlled area). For example, the provisioning system may cause one or more computing devices to turn on in accordance with the computing configuration, may cause one or more software applications to launch on the one or more computing devices in accordance with the computing configuration, and/or may cause the one or more software applications to launch in a particular state, among other examples. To cause configuration of the computing environment according to the computing configuration, the provisioning system may generate and transmit control signals for the computing devices. The control signals may indicate the computing configuration, or a relevant portion thereof. The control signals may be transmitted directly from the provisioning system to the computing devices, or transmitted via an intermediary system, such as the cloud computing system and/or the physical control system. In some implementations, the provisioning system may include the cloud computing system and/or the physical control system.

Figure 1D:
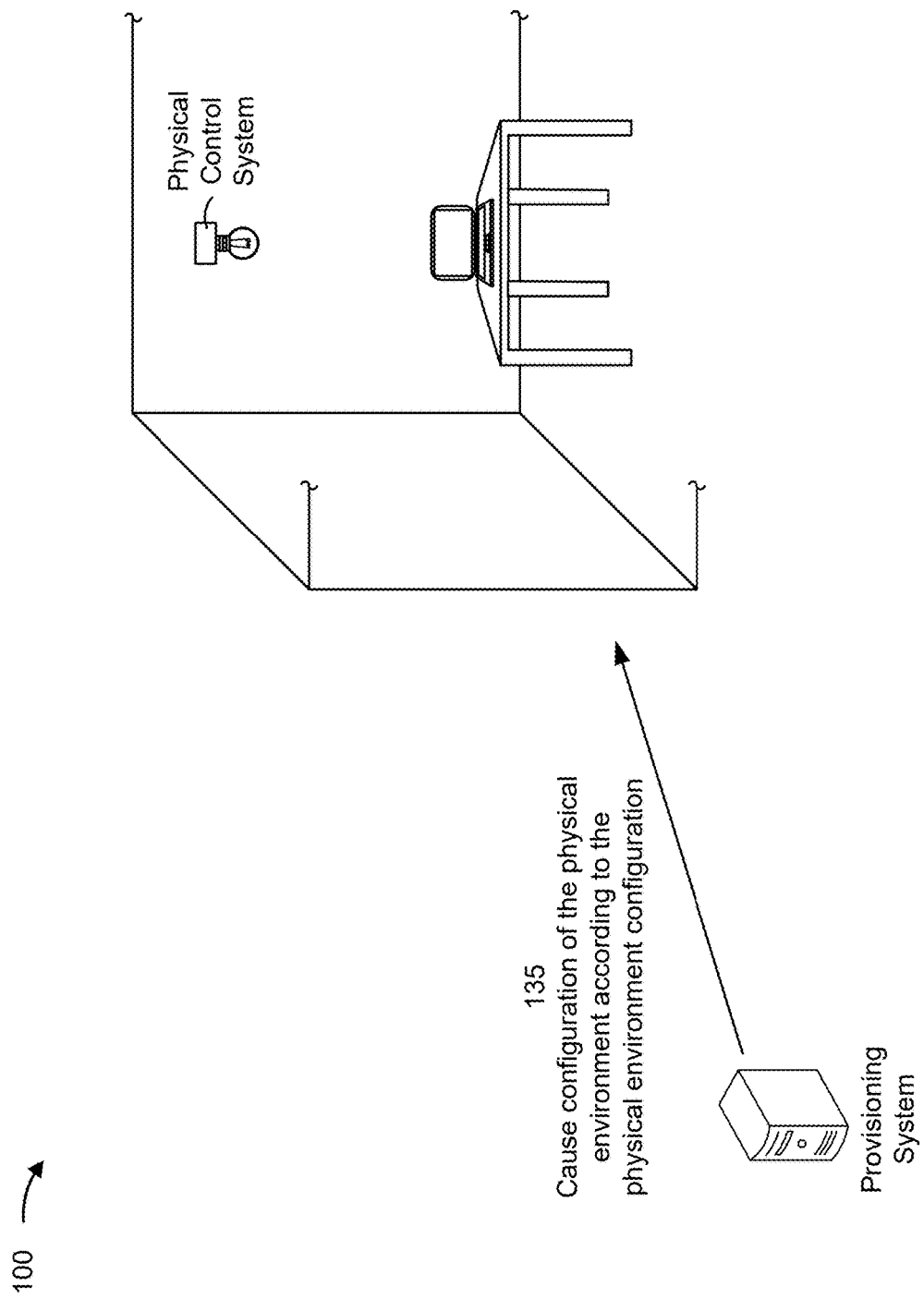

As shown in FIG. 1D, and by reference number 135, the provisioning system may cause configuration of the physical environment according to the physical environment configuration. For example, the provisioning system may cause one or more lighting devices to use a particular lighting setting, may cause one or more temperature control devices to use a particular temperature setting, and/or may cause one or more desks to use a particular height setting. To cause configuration of the physical environment according to the physical environment configuration, the provisioning system may generate and transmit control signals for control devices of the physical environment. The control signals may indicate the physical environment configuration, or a relevant portion thereof. The control signals may be transmitted directly from the provisioning system to the computing devices, or transmitted via an intermediary system, such as the physical control system. In some implementations, the provisioning system may include the physical control system.

Figure 1E:
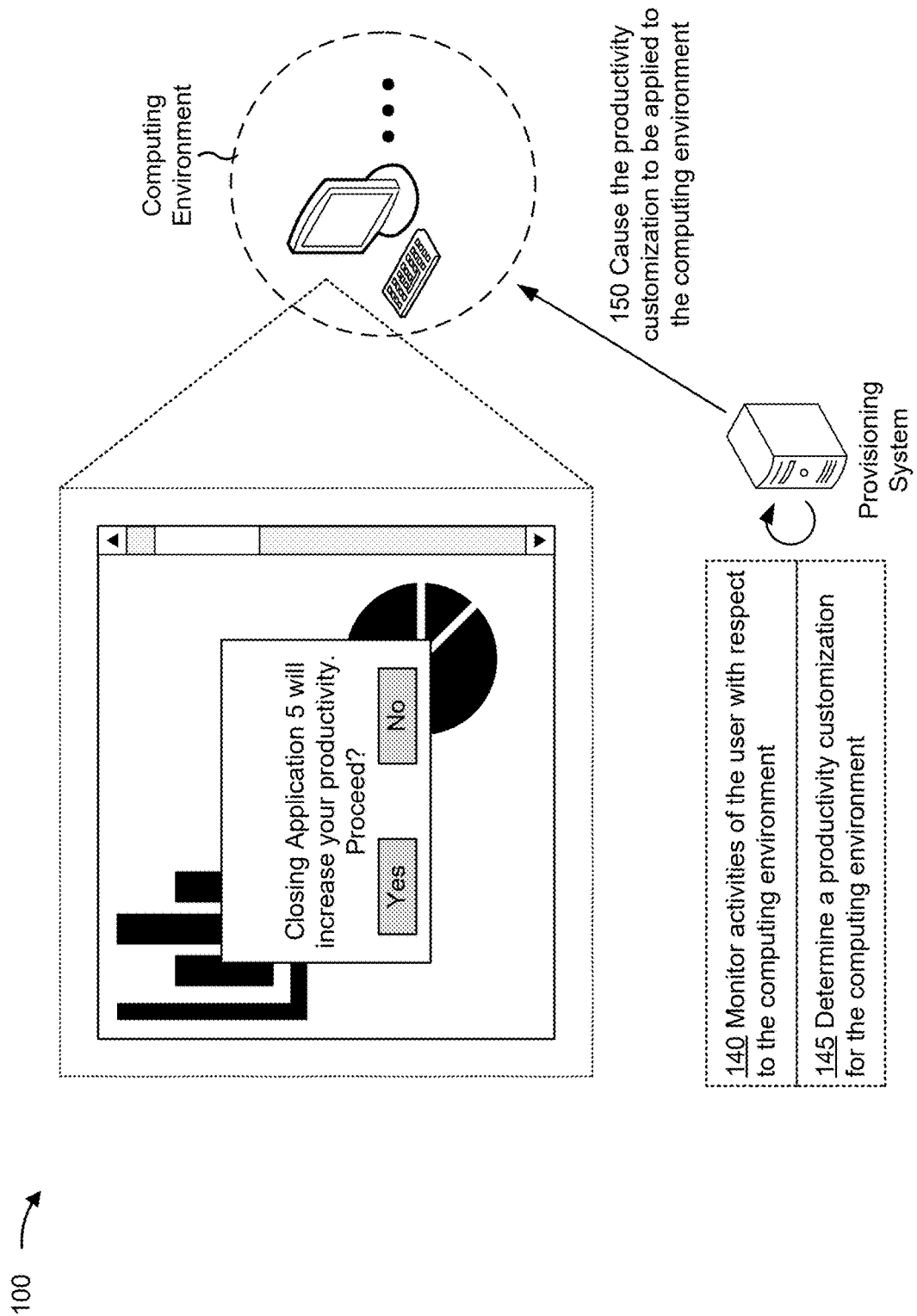

As shown in FIG. 1E, and by reference number 140, the provisioning system may monitor activities of the user with respect to the computing environment. For example, the provisioning system may monitor whether the user turns on one or more computing devices, whether the user turns off one or more computing devices, whether the user launches one or more software applications, whether the user terminates one or more software applications, an amount of time that the user is using a particular computing device, an amount of time that the user is using a particular software application, changes to a state of a software application made by the user, messages sent or received by the user, and/or inputs made by the user to a computing device (e.g., typing, mouse clicks, or the like), among other examples.

As shown by reference number 145, the provisioning system may determine a productivity customization for the computing environment. The productivity customization may be based on the use of the computing environment by the user. The productivity customization may be an adjustment to the hardware configuration and/or the software configuration of the computing environment that is intended to improve the productivity of the user's use of the computing environment. The provisioning system may determine the productivity customization using the one or more machine learning models, as described further in connection with FIG. 2. For example, the one or more machine learning models may be trained to output a productivity customization based on an input of data relating to the activities of the user with respect to the computing environment. Training data for the one or more machine learning models may be based on historical usage data associated with the user or one or more other users. As shown by reference number 150, the provisioning system may cause the productivity customization to be applied to the computing environment. For example, the provisioning system may cause the productivity customization to be applied to the computing environment based on determining the productivity customization.

In some implementations, the productivity customization may be powering off one or more computing devices, terminating one or more software applications, and/or transitioning one or more software applications to a background mode, such as if those computing devices or software applications are unused by the user or causing distraction to the user. For example, the provisioning system may determine one or more tasks that the user is to perform in the session (e.g., based on the session-specific profile), determine one or more computing devices and/or software applications that are to be used to perform the tasks (e.g., based on the historical behavioral data), and cause one or more computing devices and/or one or more software applications that the user is using, but that are determined not to be used to perform the tasks, to be powered off, terminated, or transitioned to a background mode.

In some implementations, the productivity customization may be powering on of one or more computing devices, launching one or more software applications, and/or transitioning one or more software applications to a foreground mode, such as if those computing devices or software applications would be beneficial to the user. For example, the provisioning system may determine one or more tasks that the user is to perform in the session, determine one or more computing devices and/or software applications that are used to perform the tasks, and cause one or more computing devices and/or one or more software applications, that the user is not using but are determined to be used to perform the tasks, to be powered on, launched, or transitioned to a foreground mode.

In some implementations, the productivity customization may be adjusting a state of a software application. Adjusting a state of a software application may include opening one or more files in the software application, closing one or more files in the software application, changing one or more preference settings for the software application, opening one or more user interfaces (e.g., web browser tabs) of the software application, and/or closing one or more user interfaces of the software application. For example, the provisioning system may determine one or more tasks that the user is to perform in the session, determine an optimal state of a software application to perform the task (e.g., based on the historical behavioral data), and cause an adjustment to a state of the software application based on the optical state.

In some implementations, the productivity customization may be muting of alerts associated with an instant messaging software application, an email software application, and/or a telecommunication device (e.g., a telephone or a videophone), among other examples. For example, based on monitoring the use of the computing environment by the user, the provisioning system may determine that the user is engaged in focused work, and cause muting of the alerts based on determining that the user is engaged in focused work.

In some implementations, the productivity customization may be automation of a repetitive task. A repetitive task may include completing multiple forms in an identical manner, copying and pasting from a file line-by-line or cell-by-cell, or opening and printing multiple files from a folder, among other examples. For example, based on monitoring the use of the computing environment by the user, the provisioning system may detect a repetitive task that is being performed by the user (e.g., the task is performed a threshold quantity of times in a particular time period), generate executable code (e.g., using artificial intelligence, recording a macro, or the like) to automate the repetitive task, and cause execution of the executable code to automate the repetitive task. The provisioning system may detect a repetitive task by monitoring and detecting repetitive keystrokes, repetitive cursor movements, repetitive typing, or the like.

The provisioning system may autonomously apply the productivity customization (e.g., without the user granting permission for the productivity customization to be applied). In some implementations, the provisioning system may generate a message indicating a recommendation of the productivity customization, receive an input from the user indicating whether the productivity customization is to be adopted, and cause the productivity customization to be applied to the computing environment based on the input indicating that the productivity customization is to be adopted.

In some implementations, the provisioning system may determine that the user's session is to be ended. For example, the provisioning system may determine that the user's session is to be ended based on a time of day, based on identifying that the user has exited the access-controlled area, and/or based on detecting a duration of inactivity of the user in the computing environment, among other examples. Based on a determination that the user's session is to be ended, the provisioning system may power off the computing devices, cause configuration of the computing environment according to a sleep setting (e.g., which may include powering off one or more computing devices and/or transitioning one or more computing devices to a sleep mode), and/or cause configuration of the physical environment according to a sleep setting (e.g., which may include turning off one or more lights, dimming one or more lights, raising a temperature setting used by one or more temperature control devices, or the like). In some implementations, the provisioning system may determine a session-specific profile for the user for a next session of the user, determine a computing configuration for the computing environment based on the session-specific profile for the next session, and cause configuration of the computing environment according to the computing configuration, as described herein.

In this way, the provisioning system may dynamically provision the computing environment at the beginning of the user's sessions as well as at one or more times throughout the user's session. Accordingly, the computing environment is tailored to the particular needs of the user, thereby conserving power resources and/or network resources that otherwise would be consumed by powering on hardware devices that are not needed by the user, as well as conserving computing resources that otherwise would be consumed by launching software applications that are not needed by the user.

As indicated above, FIGS. 1A-1E are provided as an example. Other examples may differ from what is described with regard to FIGS. 1A-1E.

FIG. 2 is a diagram illustrating an example 200 of training and using a machine learning model in connection with dynamic provisioning of a computing environment. The machine learning model training and usage described herein may be performed using a machine learning system. The machine learning system may include or may be included in a computing device, a server, a cloud computing environment, or the like, such as the provisioning system and/or the cloud computing system described in more detail elsewhere herein.

As shown by reference number 205, a machine learning model may be trained using a set of observations. The set of observations may be obtained from training data (e.g., historical data), such as data gathered during one or more processes described herein. In some implementations, the machine learning system may receive the set of observations (e.g., as input) from the provisioning system, the access system, the cloud computing system, the data system, and/or the physical control system, as described elsewhere herein.

As shown by reference number 210, the set of observations may include a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the provisioning system, the access system, the cloud computing system, the data system, and/or the physical control system. For example, the machine learning system may identify a feature set (e.g., one or more features and/or feature values) by extracting the feature set from structured data, by performing natural language processing to extract the feature set from unstructured data, and/or by receiving input from an operator.

As an example, a feature set for a set of observations may include a first feature of office location, a second feature of appointments, a third feature of tasks, and so on. As shown, for a first observation, the first feature may have a value of Chicago, the second feature may have a value of 9 am and 12 µm, the third feature may have a value of t1, t2, etc., where t1 and t2 represent particular tasks that are to be performed, and so on. These features and feature values are provided as examples, and may differ in other examples. For example, the feature set may include one or more of the following features: a work location used by a user (e.g., an office location, a home location, a hotel location, an on-site location, or the like), a time of entry of a user into an access-controlled area, a time a user begins a session for a computing environment, a time of an appointment for a user, a location of an appointment (e.g., a particular conference room), a type of an appointment (e.g., in person or virtual), participants for an appointment, a length of an appointment, a type of task to be performed by a user (e.g., create a spreadsheet, research a competitor, review a document, or the like), a person or entity requesting a task, a department with which a task is associated, a team with which a task is associated, a deadline for completing a task, a role of a user in an organizational structure, a work schedule of a user, and/or a current day of the week, among other examples.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiples classes, classifications, or labels) and/or may represent a variable having a Boolean value. A target variable may be associated with a target variable value, and a target variable value may be specific to an observation. In example 200, the target variable is computing configuration, which has a value of c1, c2, etc., for the first observation, where c1 and c2 represent particular parameter values for a hardware configuration and/or a software configuration (e.g., turn on device A, launch software application A, or the like).

The feature set and target variable described above are provided as examples, and other examples may differ from what is described above. For example, for a target variable of productivity customization, the feature set may include a time spent by a user using a software application, a quantity of software applications currently open, a state of a software application (e.g., a quantity of files of the software application currently open, a quantity of user interfaces of the software application currently open, or the like) a quantity of messages received by a user, a quantity of messages responded to by a user, a quantity of phone calls received by a user, a quantity of phone calls answered by a user, a quantity of time spent typing by a user, and/or a quantity of time spent scrolling in a software application by a user, among other examples.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, or the like. For example, using a neural network algorithm, the machine learning system may train a machine learning model to output (e.g., at an output layer) a computing configuration based on an input (e.g., at an input layer) of a session-specific profile for the user, as described elsewhere herein. In particular, the machine learning system, using the neural network algorithm, may train the machine learning model, using the set of observations from the training data, to derive weights for one or more nodes in the input layer, in the output layer, and/or in one or more hidden layers (e.g., between the input layer and the output layer). Nodes in the input layer may represent features of a feature set of the machine learning model, such as a first node representing office location, a second node representing appointments, a third node representing tasks, and so forth. One or more nodes in the output layer may represent output(s) of the machine learning model, such as a node indicating the computing configuration, or multiple nodes each indicating one or more parameters of the computing configuration. The weights learned by the machine learning model facilitate transformation of the input of the machine learning model to the output of the machine learning model. After training, the machine learning system may store the machine learning model as a trained machine learning model 225 to be used to analyze new observations.

As an example, the machine learning system may obtain training data for the set of observations based on historical behavioral data associated with a use of a computing environment by one or more users. For example, user activity with respect to the computing environment (e.g., turning on devices, turning off devices, launching software application, terminating software applications, or the like) may be logged and stored in one or more databases. As an example, the machine learning system may obtain the historical behavioral data from the one or more databases (e.g., which may be implemented by the cloud computing system or the data system).

As shown by reference number 230, the machine learning system may apply the trained machine learning model 225 to a new observation, such as by receiving a new observation and inputting the new observation to the trained machine learning model 225. As shown, the new observation may include a first feature of office location, a second feature of appointments, a third feature of tasks, and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs and/or information that indicates a degree of similarity between the new observation and one or more other observations, such as when unsupervised learning is employed.

As an example, the trained machine learning model 225 may predict a value of $c_1$, $c_2$, etc., where $c_1$ and $c_2$ represent particular parameter values for a hardware configuration and/or a software configuration, for the target variable of computing configuration for the new observation, as shown by reference number 235. Based on this prediction, the machine learning system may provide a first recommendation, may provide output for determination of a first recommendation, may perform a first automated action, and/or may cause a first automated action to be performed (e.g., by instructing another device to perform the automated action), among other examples. The first recommendation may include, for example, a recommendation to launch a software application. The first automated action may include, for example, causing launching of a software application.

As another example, if the machine learning system were to predict a value of $c_3$, $c_4$, etc., where $c_3$ and $c_4$ represent different parameter values for the hardware configuration and/or the software configuration, for the target variable of computing configuration, then the machine learning system may provide a second (e.g., different) recommendation (e.g., a recommendation to terminate a software application) and/or may perform or cause performance of a second (e.g., different) automated action (e.g., cause terminating of a software application).

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a first cluster, then the machine learning system may provide a first recommendation, such as the first recommendation described above. Additionally, or alternatively, the machine learning system may perform a first automated action and/or may cause a first automated action to be performed (e.g., by instructing another device to perform the automated action) based on classifying the new observation in the first cluster, such as the first automated action described above.

As another example, if the machine learning system were to classify the new observation in a second cluster, then the machine learning system may provide a second (e.g., different) recommendation (e.g., the second recommendation described above) and/or may perform or cause performance of a second (e.g., different) automated action, such as the second automated action described above.

In some implementations, the recommendation and/or the automated action associated with the new observation may be based on a target variable value having a particular label (e.g., classification or categorization), may be based on whether a target variable value satisfies one or more threshold (e.g., whether the target variable value is greater than a threshold, is less than a threshold, is equal to a threshold, falls within a range of threshold values, or the like), and/or may be based on a cluster in which the new observation is classified.

The recommendations, actions, and clusters described above are provided as examples, and other examples may differ from what is described above.

In some implementations, the trained machine learning model 225 may be re-trained using feedback information. For example, feedback may be provided to the machine learning model. The feedback may be associated with actions performed based on the recommendations provided by the trained machine learning model 225 and/or automated actions performed, or caused, by the trained machine learning model 225. In other words, the recommendations and/or actions output by the trained machine learning model 225 may be used as inputs to re-train the machine learning model (e.g., a feedback loop may be used to train and/or update the machine learning model). For example, the feedback information may include whether a user accepts or rejects a recommendation, or whether a user performs an action to undo an automated action (e.g., the user re-launches a software application that was automatically terminated).

In this way, the machine learning system may apply a rigorous and automated process to dynamically provision a computing environment. The machine learning system may enable recognition and/or identification of tens, hundreds, thousands, or millions of features and/or feature values for tens, hundreds, thousands, or millions of observations, thereby increasing accuracy and consistency and reducing delay associated with dynamic provisioning of a computing environment relative to requiring computing resources to be allocated for tens, hundreds, or thousands of operators to manually determine a configuration for a computing environment using the features or feature values.

As indicated above, FIG. 2 is provided as an example. Other examples may differ from what is described in connection with FIG. 2.

Figure 3:
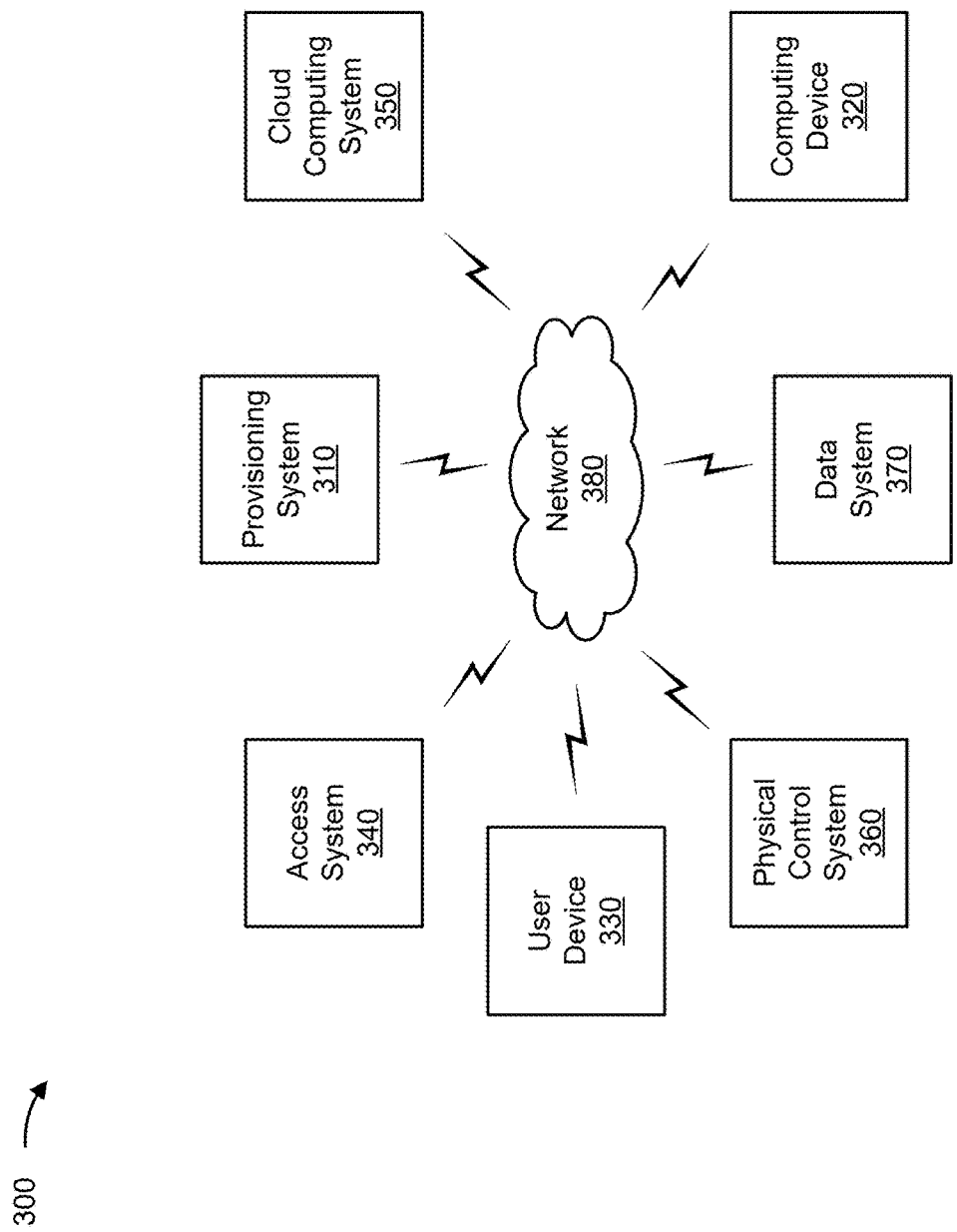
FIG. 3 is a diagram of an example environment in which systems and/or methods described herein may be implemented, in accordance with some embodiments of the present disclosure.

FIG. 3 is a diagram of an example environment 300 in which systems and/or methods described herein may be implemented. As shown in FIG. 3, environment 300 may include a provisioning system 310, a computing device 320, a user device 330, an access system 340, a cloud computing system 350, an physical control system 360, a data system 370, and a network 380. Devices of environment 300 may interconnect via wired connections, wireless connections, or a combination of wired and wireless connections.

The provisioning system 310 may include one or more devices capable of receiving, generating, storing, processing, providing, and/or routing information associated with dynamic provisioning of a computing environment, as described elsewhere herein. The provisioning system 310 may include a communication device and/or a computing device. For example, the provisioning system 310 may include a server, such as an application server, a client server, a web server, a database server, a host server, a proxy server, a virtual server (e.g., executing on computing hardware), or a server in a cloud computing system. In some implementations, the provisioning system 310 may include computing hardware used in a cloud computing environment.

The computing device 320 may include one or more devices capable of receiving, generating, storing, processing, and/or providing information associated with a computing environment, as described elsewhere herein. The computing device 320 may include a communication device and/or a computing device. For example, the computing device 320 may include a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), a printer, a scanner, a telecommunication system, a monitor, a television, a projector device, or a similar type of device.

The user device 330 may include one or more devices capable of receiving, generating, storing, processing, and/or providing information associated with accessing an access-controlled area, as described elsewhere herein. The user device 330 may include a communication device and/or a computing device. For example, the user device 330 may include a key card, a key fob, a wireless communication device, a mobile phone, a wearable communication device, or a similar type of device.

The access system 340 may include one or more devices capable of receiving, generating, storing, processing, providing, and/or routing information associated with accessing an access-controlled area, as described elsewhere herein. The access system 340 may include a communication device and/or a computing device. For example, the access system 340 may include a server, such as an application server, a client server, a web server, a database server, a host server, a proxy server, a virtual server (e.g., executing on computing hardware), or a server in a cloud computing system. In some implementations, the access system 340 may include computing hardware used in a cloud computing environment.

The cloud computing system 350 may include one or more devices capable of receiving, generating, storing, processing, providing, and/or routing information associated with virtual machines, as described elsewhere herein. The cloud computing system 350 may include a communication device and/or a computing device. For example, the cloud computing system 350 may include a server, such as an application server, a client server, a web server, a database server, a host server, a proxy server, a virtual server (e.g., executing on computing hardware), or a server in a cloud computing system. In some implementations, the cloud computing system 350 may include computing hardware used in a cloud computing environment.

The physical control system 360 may include one or more devices capable of receiving, generating, storing, processing, providing, and/or routing information associated with control of physical devices (e.g., lights, temperature controls, desks, or the like), as described elsewhere herein. The physical control system 360 may include a communication device and/or a computing device. For example, the physical control system 360 may include a server, such as an application server, a client server, a web server, a database server, a host server, a proxy server, a virtual server (e.g., executing on computing hardware), or a server in a cloud computing system. In some implementations, the physical control system 360 may include computing hardware used in a cloud computing environment. In some implementations, the physical control system may include an Internet of Things (IoT) system.

The data system 370 may include one or more devices capable of receiving, generating, storing, processing, and/or providing information associated with user data, as described elsewhere herein. The data system 370 may include a communication device and/or a computing device. For example, the data system 370 may include a data structure, a database, a data source, a server, a database server, an application server, a client server, a web server, a host server, a proxy server, a virtual server (e.g., executing on computing hardware), a server in a cloud computing system, a device that includes computing hardware used in a cloud computing environment, or a similar type of device. As an example, the data system 370 may store user metadata, as described elsewhere herein.

The network 380 may include one or more wired and/or wireless networks. For example, the network 380 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 380 enables communication among the devices of environment 300.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
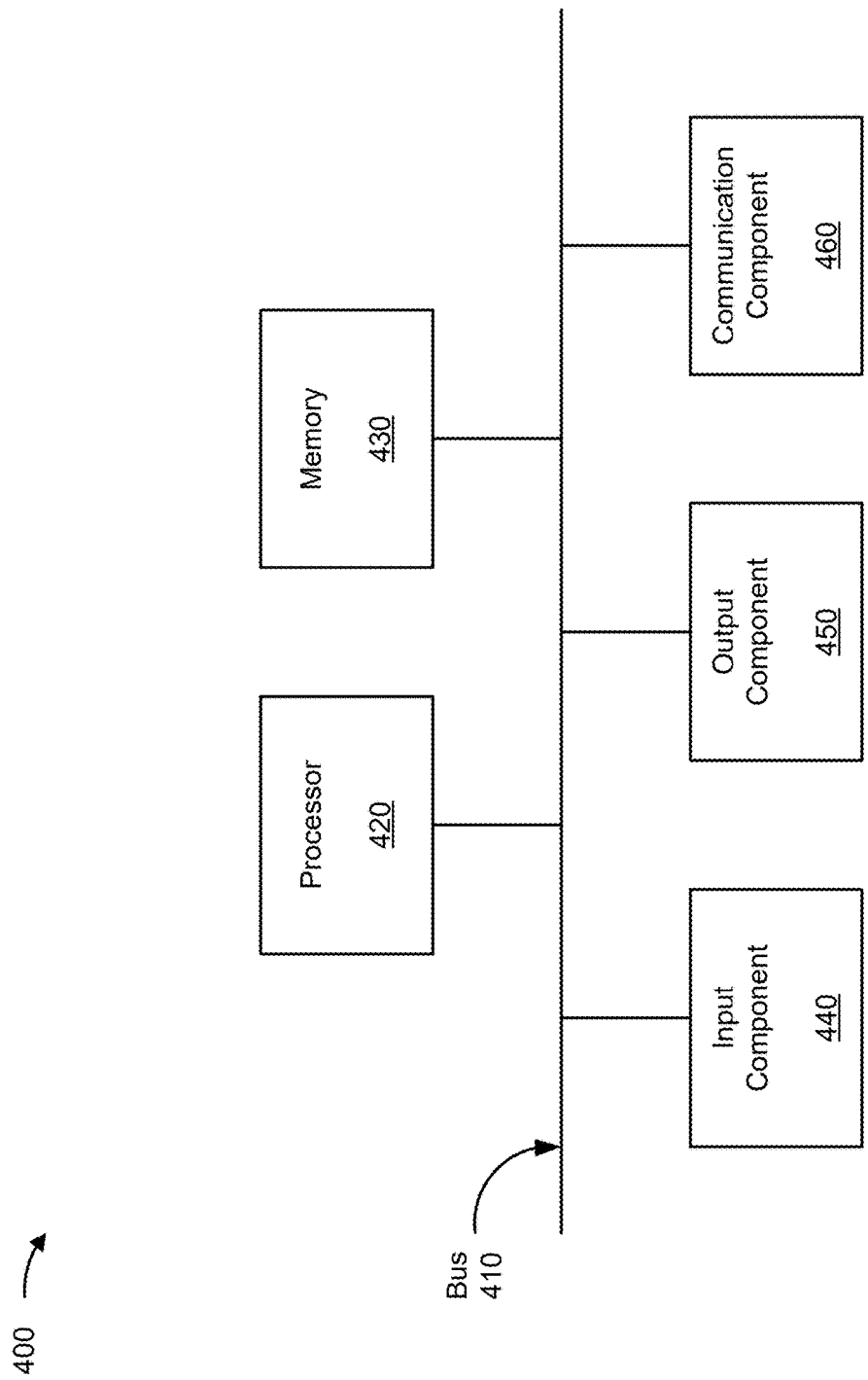
FIG. 4 is a diagram of example components of a device associated with dynamic provisioning of a computing environment, in accordance with some embodiments of the present disclosure.

FIG. 4 is a diagram of example components of a device 400 associated with dynamic provisioning of a computing environment. The device 400 may correspond to provisioning system 310, computing device 320, user device 330, access system 340, cloud computing system 350, physical control system 360, and/or data system 370. In some implementations, provisioning system 310, computing device 320, user device 330, access system 340, cloud computing system 350, physical control system 360, and/or data system 370 may include one or more devices 400 and/or one or more components of the device 400. As shown in FIG. 4, the device 400 may include a bus 410, a processor 420, a memory 430, an input component 440, an output component 450, and/or a communication component 460.

The bus 410 may include one or more components that enable wired and/or wireless communication among the components of the device 400. The bus 410 may couple together two or more components of FIG. 4, such as via operative coupling, communicative coupling, electronic coupling, and/or electric coupling. For example, the bus 410 may include an electrical connection (e.g., a wire, a trace, and/or a lead) and/or a wireless bus. The processor 420 may include a central processing unit, a graphics processing unit, a microprocessor, a controller, a microcontroller, a digital signal processor, a field-programmable gate array, an application-specific integrated circuit, and/or another type of processing component. The processor 420 may be implemented in hardware, firmware, or a combination of hardware and software. In some implementations, the processor 420 may include one or more processors capable of being programmed to perform one or more operations or processes described elsewhere herein.

The memory 430 may include volatile and/or nonvolatile memory. For example, the memory 430 may include random access memory (RAM), read only memory (ROM), a hard disk drive, and/or another type of memory (e.g., a flash memory, a magnetic memory, and/or an optical memory). The memory 430 may include internal memory (e.g., RAM, ROM, or a hard disk drive) and/or removable memory (e.g., removable via a universal serial bus connection). The memory 430 may be a non-transitory computer-readable medium. The memory 430 may store information, one or more instructions, and/or software (e.g., one or more software applications) related to the operation of the device 400. In some implementations, the memory 430 may include one or more memories that are coupled (e.g., communicatively coupled) to one or more processors (e.g., processor 420), such as via the bus 410. Communicative coupling between a processor 420 and a memory 430 may enable the processor 420 to read and/or process information stored in the memory 430 and/or to store information in the memory 430.

The input component 440 may enable the device 400 to receive input, such as user input and/or sensed input. For example, the input component 440 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 450 may enable the device 400 to provide output, such as via a display, a speaker, and/or a light-emitting diode. The communication component 460 may enable the device 400 to communicate with other devices via a wired connection and/or a wireless connection. For example, the communication component 460 may include a receiver, a transmitter, a transceiver, a modem, a network interface card, and/or an antenna.

The device 400 may perform one or more operations or processes described herein. For example, a non-transitory computer-readable medium (e.g., memory 430) may store a set of instructions (e.g., one or more instructions or code) for execution by the processor 420. The processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry may be used instead of or in combination with the instructions to perform one or more operations or processes described herein. Additionally, or alternatively, the processor 420 may be configured to perform one or more operations or processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
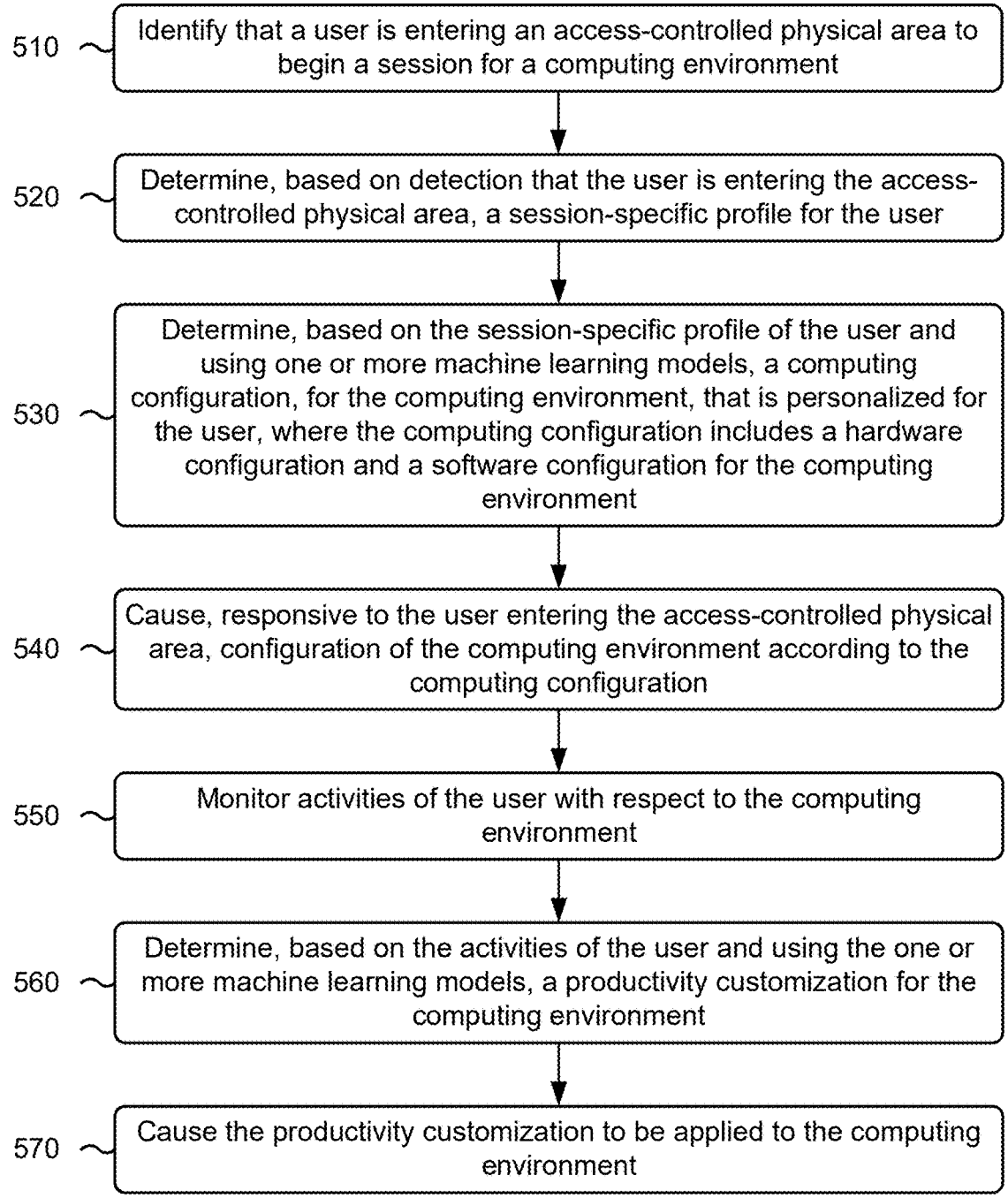
FIG. 5 is a flowchart of an example process associated with dynamic provisioning of a computing environment, in accordance with some embodiments of the present disclosure.

FIG. 5 is a flowchart of an example process 500 associated with dynamic provisioning of a computing environment. In some implementations, one or more process blocks of FIG. 5 may be performed by the provisioning system 310. In some implementations, one or more process blocks of FIG. 5 may be performed by another device or a group of devices separate from or including the provisioning system 310, such as the computing device 320, the user device 330, the access system 340, the cloud computing system 350, the physical control system 360, and/or the data system 370. Additionally, or alternatively, one or more process blocks of FIG. 5 may be performed by one or more components of the device 400, such as processor 420, memory 430, input component 440, output component 450, and/or communication component 460.

As shown in FIG. 5, process 500 may include identifying that a user is entering an access-controlled area to begin a session for the computing environment (block 510). For example, the provisioning system 310 (e.g., using processor 420 and/or memory 430) may identify that a user is entering an access-controlled area to begin a session for the computing environment, as described above in connection with reference number 105 of FIG. 1A. As an example, the provisioning system 310 may receive an indication from the access system 340 that the user is entering the access-controlled area, and the provisioning system 310 may identify that the user is entering the access-controlled area based on the indication.

As further shown in FIG. 5, process 500 may include determining, based on detection that the user is entering the access-controlled area, a session-specific profile for the user (block 520). For example, the provisioning system 310 (e.g., using processor 420 and/or memory 430) may determine, based on detection that the user is entering the access-controlled area, a session-specific profile for the user, as described above in connection with reference number 115 of FIG. 1B. As an example, the session-specific profile may indicate characteristics associated with the user in connection with the session, and the provisioning system 310 may determine the session-specific profile for the user based on user-generated data, user metadata, and/or user time and location data.

As further shown in FIG. 5, process 500 may include determining, based on the session-specific profile of the user and using one or more machine learning models, a computing configuration, for the computing environment, that is personalized for the user, where the computing configuration includes a hardware configuration and a software configuration for the computing environment (block 530). For example, the provisioning system 310 (e.g., using processor 420 and/or memory 430) may determine, based on the session-specific profile of the user and using one or more machine learning models, a computing configuration, for the computing environment, that is personalized for the user, as described above in connection with reference number 120 of FIG. 1B. As an example, the hardware configuration may indicate whether particular computing devices of the computing environment are to be powered on or powered off, when the particular computing devices of the computing environment are to be powered on or powered off, and/or whether particular computing devices of the computing environment are to be in a standby mode or a sleep mode, among other examples. Continuing with the example, the software configuration may indicate one or more software applications that are to be launched at a startup of a computing device, a state in which a software application is to be launched, and/or whether a software application is to be launched in a background or in a foreground, among other examples.

As further shown in FIG. 5, process 500 may include causing, responsive to the user entering the access-controlled area, configuration of the computing environment according to the computing configuration (block 540). For example, the provisioning system 310 (e.g., using processor 420, memory 430, output component 450, and/or communication component 460) may cause, responsive to the user entering the access-controlled area, configuration of the computing environment according to the computing configuration, as described above in connection with reference number 130 of FIG. 1C. As an example, the provisioning system 310 may cause one or more computing devices to turn on in accordance with the computing configuration, may cause one or more software applications to launch on the one or more computing devices in accordance with the computing configuration, and/or may cause the one or more software applications to launch in a particular state, among other examples.

As further shown in FIG. 5, process 500 may include monitoring activities of the user with respect to the computing environment (block 550). For example, the provisioning system 310 (e.g., using processor 420 and/or memory 430) may monitor activities of the user with respect to the computing environment, as described above in connection with reference number 140 of FIG. 1E. As an example, the provisioning system 310 may monitor whether the user turns on one or more computing devices, whether the user turns off one or more computing devices, whether the user launches one or more software applications, whether the user terminates one or more software applications, an amount of time that the user is using a particular computing device, an amount of time that the user is using a particular software application, changes to a state of a software application made by the user, messages sent or received by the user, and/or inputs made by the user to a computing device (e.g., typing, mouse clicks, or the like), among other examples.

As further shown in FIG. 5, process 500 may include determining, based on the activities of the user and using the one or more machine learning models, a productivity customization for the computing environment (block 560). For example, the provisioning system 310 (e.g., using processor 420 and/or memory 430) may determine, based on the activities of the user and using the one or more machine learning models, a productivity customization for the computing environment, as described above in connection with reference number 145 of FIG. 1E. As an example, the productivity customization may be an adjustment to the hardware configuration and/or the software configuration of the computing environment that is intended to improve the productivity of the user's use of the computing environment.

As further shown in FIG. 5, process 500 may include causing the productivity customization to be applied to the computing environment (block 570). For example, the provisioning system 310 (e.g., using processor 420 and/or memory 430) may cause the productivity customization to be applied to the computing environment, as described above in connection with reference number 150 of FIG. 1E. As an example, the productivity customization may be automation of a repetitive task.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel. The process 500 is an example of one process that may be performed by one or more devices described herein. These one or more devices may perform one or more other processes based on operations described herein, such as the operations described in connection with FIGS. 1A-1E. Moreover, while the process 500 has been described in relation to the devices and components of the preceding figures, the process 500 can be performed using alternative, additional, or fewer devices and/or components. Thus, the process 500 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors configured to: perform X; perform Y; and perform Z," that claim should be interpreted to mean "one or more processors configured to perform X; one or more (possibly different) processors configured to perform Y; and one or more (also possibly different) processors configured to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for dynamic provisioning of a computing environment, the system comprising:
   one or more memories; and
   one or more processors, communicatively coupled to the one or more memories, configured to:
      identify that a user is entering an access-controlled area to begin a session for the computing environment;
      determine, based on detection that the user is entering the access-controlled area, a session-specific profile for the user;
      determine, based on the session-specific profile of the user and using one or more machine learning models, a computing configuration, for the computing environment, that is personalized for the user,
         wherein the computing configuration includes a hardware configuration and a software configuration for the computing environment;
      cause, responsive to the user entering the access-controlled area, configuration of the computing environment according to the computing configuration;
      monitor activities of the user with respect to the computing environment;
      determine, based on the activities of the user and using the one or more machine learning models, a productivity customization for the computing environment; and
      cause the productivity customization to be autonomously applied to the computing environment,
         wherein the productivity customization is autonomously applied without the user granting permission.

2. The system of claim 1, wherein the one or more processors, to cause the configuration of the computing environment according to the computing configuration, are to:
   generate and transmit control signals for one or more computing devices in the computing environment.

3. The system of claim 1,
   wherein the session-specific profile for the user indicates one or more of:
      a role of the user in an organizational structure,
      a location associated with the access-controlled area,
      a time of the user entering the access-controlled area,
      one or more appointments associated with the user,
      one or more deadlines associated with the user, or
      one or more tasks to be completed by the user.

4. The system of claim 1,
   wherein the hardware configuration for the computing environment indicates one or more computing devices of the computing environment that are to be powered on.

5. The system of claim 1,
   wherein the software configuration for the computing environment indicates one or more software applications that are to be launched.

6. The system of claim 5,
   wherein the software configuration for the computing environment indicates a state in which the one or more software applications are to be launched.

7. The system of claim 1,
   wherein the one or more processors, to cause the productivity customization to be applied, are configured to:
      cause termination of one or more software applications of the computing environment,
      cause closing of one or more user interfaces of a software application of the computing environment, or
      cause transitioning of one or more software applications to a background mode.

8. The system of claim 1,
   wherein the one or more machine learning models are trained to determine the computing configuration for the computing environment based on historical behavior of the user or one or more other users.

9. A method for dynamic provisioning of a computing environment, comprising:
   determining, by a device, a session-specific profile for a user that is to begin a session for the computing environment;
   determining, by the device, a computing configuration, for the computing environment, that is personalized for the user based on the session-specific profile for the user and based on historical behavior of the user,
      wherein the computing configuration includes at least one of a hardware configuration or a software configuration for the computing environment; and
   causing, by the device, configuration of the computing environment according to the computing configuration,
      wherein the computing configuration is autonomously applied without the user granting permission.

10. The method of claim 9,
    wherein the computing configuration is determined using a machine learning model that is trained, based on the historical behavior of the user, to output the computing configuration based on the session-specific profile.

11. The method of claim 9,
wherein the hardware configuration for the computing environment indicates one or more computing devices of the computing environment that are to be powered on.

12. The method of claim 9,
wherein the software configuration for the computing environment indicates one or more software applications that are to be launched.

13. The method of claim 12,
wherein the software configuration for the computing environment indicates a state in which the one or more software applications are to be launched.

14. The method of claim 9, further comprising:
determining, based on the session-specific profile, a physical environment configuration for a physical environment; and
causing configuration of the physical environment according to the physical environment configuration.

15. A non-transitory computer-readable medium storing a set of instructions for dynamic provisioning of a computing environment, the set of instructions comprising:
one or more instructions that, when executed by one or more processors of a device, cause the device to:
monitor activities of a user with respect to the computing environment;
determine, based on the activities of the user and using one or more machine learning models, a productivity customization for the computing environment; and
cause the productivity customization to be autonomously applied to the computing environment,
wherein the productivity customization is autonomously applied without the user granting permission.

16. The non-transitory computer-readable medium of claim 15,
wherein the one or more instructions, that cause the device to cause the productivity customization to be applied, cause the device to:
cause termination of one or more software applications of the computing environment.

17. The non-transitory computer-readable medium of claim 15,
wherein the one or more instructions, that cause the device to cause the productivity customization to be applied, cause the device to:
cause closing of one or more user interfaces of a software application of the computing environment.

18. The non-transitory computer-readable medium of claim 15,
wherein the one or more instructions, that cause the device to cause the productivity customization to be applied, cause the device to:
cause transitioning of one or more software applications to a background mode.

19. The non-transitory computer-readable medium of claim 15,
wherein the one or more instructions, that cause the device to cause the productivity customization to be applied, cause the device to:
detect a repetitive task that is performed by the user in the computing environment;
generate executable code to automate the repetitive task; and
cause execution of the executable code to automate the repetitive task.

20. The non-transitory computer-readable medium of claim 15,
wherein the one or more instructions, that cause the device to cause the productivity customization to be applied, cause the device to:
cause muting of alerts associated with an instant messaging software application, an email software application, or a telecommunication device.

* * * * *